United States Patent [19]

Leiber

[11] Patent Number: 4,620,750
[45] Date of Patent: Nov. 4, 1986

[54] MAIN BRAKE CYLINDER
[75] Inventor: Heinz Leiber, Oberriexingen, Fed. Rep. of Germany
[73] Assignee: Robert Bosch GmbH, Stuttgart, Fed. Rep. of Germany
[21] Appl. No.: 548,044
[22] Filed: Nov. 2, 1983
[30] Foreign Application Priority Data
  Nov. 4, 1982 [DE] Fed. Rep. of Germany ....... 3240680
[51] Int. Cl.$^4$ .............................. B60T 8/44; F15B 7/00
[52] U.S. Cl. .................................... 303/114; 60/545; 60/551; 60/591
[58] Field of Search .................. 60/545, 551, 547.1, 60/548, 591; 91/367; 303/114

[56]         References Cited
       U.S. PATENT DOCUMENTS

| | | | |
|---|---|---|---|
| 2,678,177 | 5/1954 | Chenery | 91/367 |
| 2,939,653 | 6/1960 | Rasmussen | 91/367 |
| 3,795,426 | 3/1974 | Sisson | 303/114 |
| 3,972,382 | 8/1976 | Takayama | 303/114 |
| 4,143,514 | 3/1979 | Leiber | 60/545 |
| 4,206,605 | 6/1980 | Mehren | 60/545 |
| 4,395,883 | 8/1983 | Melinat | 60/545 |
| 4,483,144 | 11/1984 | Steffes | 60/591 |

Primary Examiner—Abraham Hershkovitz
Attorney, Agent, or Firm—Edwin E. Greigg

[57]         ABSTRACT

A main brake cylinder for vehicle brake systems, in which a control valve effects the application of an auxiliary force to at least one brake piston. Additionally engaging the control valve and supplementarily for possibly adjusting the brake pedal is an arbitrarily actuatable final control element, which is triggered by electrical signals of any desired form and duration. As a result, a feeding of pressure into the brake circuit is effected independently of the brake pedal actuation and as a function of electrical control signals, as a result of which a multiplicity of further possible applications of such a brake valve are afforded, for instance in order to realize a drive slippage regulation, self-diagnosis as to tightness, function, output and pressure supply, and stepped braking.

12 Claims, 3 Drawing Figures

MAIN BRAKE CYLINDER

BACKGROUND OF THE INVENTION

The invention is based on a main brake cylinder as generally defined hereinafter. A brake cylinder of this kind is known from German Offenlegungsschrift No. 27 23 734.

In the known main brake cylinder, the two brake circuits are connected in series both geometrically and in terms of their function, in the manner of a hydraulic dual-circuit tandem main brake cylinder. A control valve establishes the communication of the pressure source with a brake piston disposed in the amplifier cylinder, and the pressure in the other brake circuit is established by means of the displacement of a further piston under the influence of an auxiliary force. The control valve is disposed in the interior of the first piston, which in turn is supported in the amplifier cylinder.

In such brake systems, to be able to perform an arbitrary feeding of pressure, for instance in order to monitor the brake system as a whole, to regulate drive slippage or to effect an automatic interval or stopped braking, magnetic valves must be separately disposed in the brake lines, by way of which valves then when they are actuated accordingly the desired pressure can be fed into the brake circuits from a pressure source. Such provisions are complicated and expensive, because if pressure is to be fed into two brake circuits, for example, one magnetic valve or possibly a multiple-position valve as well has to be provided for each brake circuit.

OBJECT AND SUMMARY OF THE INVENTION

The main brake cylinder according to the invention has the advantage over the prior art in that a feeding of pressure into all the brake lines and into all the components of the system having to do with the building up and distribution of pressure can be realized at little additional expense, in fact with only a single additional final control element, which is embodied electrically or hydraulically. The hydraulic part required for the feeding of pressure is here replaced by the brake valve; in other words, it is the brake system itself which undertakes the pressure feeding into all its components and brake lines, using the pressure source for generating the auxiliary force which is included in the system already. It is therefore possible to feed pressure into the two brake circuits conventionally provided using the one existing final control element.

A further advantage accruing to the invention is that because of the external engagement of the final control element with the control valve belonging to the main brake cylinder, it is even possible to monitor the brake valve itself which is embodied by the main brake cylinder; for instance, if the vehicle is stopped the brake valve can be actuated, several times if desired, via the final control element. As a result, pressure medium will be called up from the pressure supply, with the result in turn that given an appropriate actuation duration a pressure switch for refilling the reservoir will respond; in other words, monitoring as to this situation is possible. It is also possible to monitor the brake system for tightness, for when full pressure feeding takes place, resulting from a full actuation of the brake valve, the brake circuits consequently have the same pressure level as the pressure supply itself. If one or more of the brake circuits or other components should not be tight, the pressure level of the pressure supply drops and can thus be registered.

Still further embodiments of the invention enable advantageous further developments of and improvements to the main brake cylinder disclosed hereinafter. It is particularly advantageous to use this main brake cylinder, with its separately triggerable external final control element engaging the existing control valve, to feed pressure for the purpose of drive slippage regulation, automatic braking of the vehicle in the sense of a stepped or spaced braking and generalized functional monitoring of the brake system as to tightness, function, output, pressure supply and the like.

If the final control element is embodied as an electromagnet, then its triggering can be effected with various current levels, in a clocked manner, with a variation over time in order to realize time/current functions, as a result of which corresponding brake reactions can be realized as well. Triggering via an electro-control magnet also makes it possible to perform an electrical monitoring of the triggering.

The use of the main brake cylinder as defined by the invention in summary provides brake-pedal-less pressure feeding for the purpose of self-diagnosis (tightness, function and output, pressure supply), for automatic braking (interval braking), for drive slippage regulation, for electrical monitoring of the pressure triggering and for use in such brake force valves in which operative faces of the pedal push rod predominantly take over the reaction of the pressure forces, or for superimposing an additional controlled force to the pedal force for increasing the rear axle braking pressure feeding up to the occurrence of ABS regulating signals or for eliminating an instance of brake fading.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
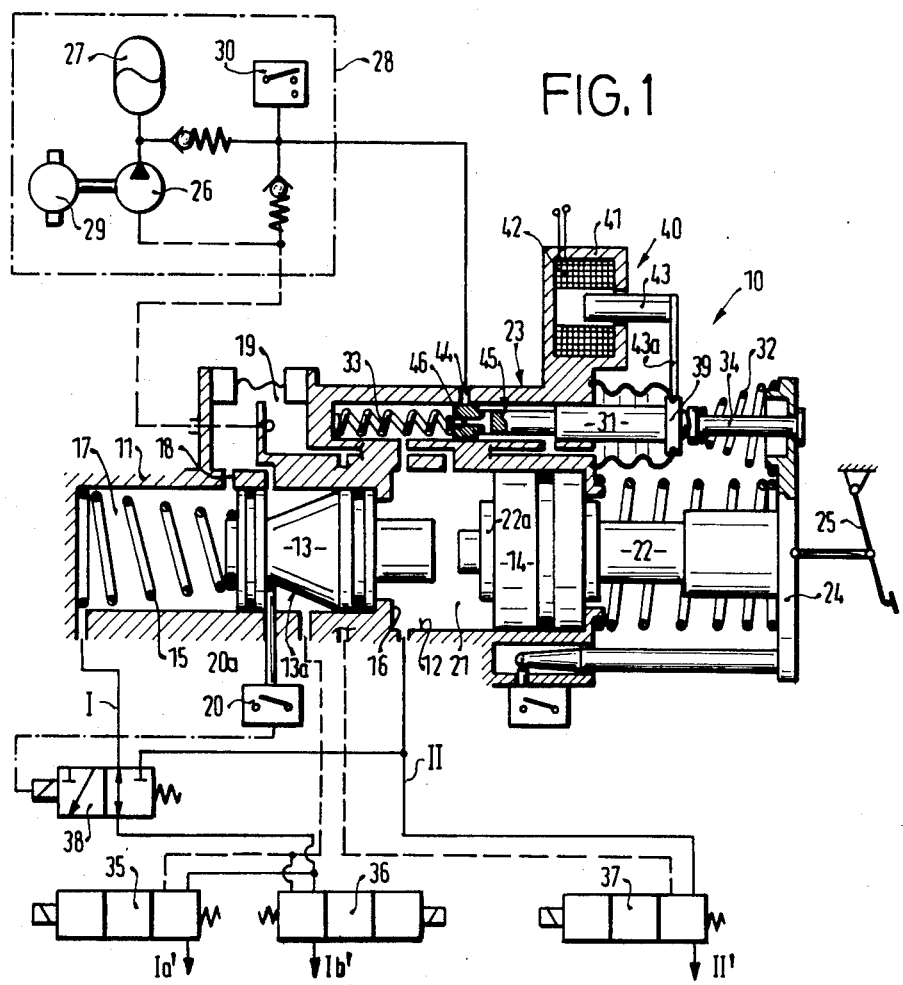
FIG. 1 shows a first exemplary embodiment of a main brake cylinder, seen in section, with a final control element in the form of an electrical control magnet engaging the control valve.

A brake valve comprising a hydraulic dualcircuit tandem main brake cylinder 10 has a housing 11 with a stepped cylinder 12, in which two pistons 13 and 14 are disposed in series. The front piston 13, which is subject to the force of a restoring spring 15, rests on a shoulder 16 formed in the cylinder and defines a work chamber 17, to which a first brake circuit I is connected. In the outset position of the piston 13 shown, the piston 13 communicates via a housing conduit 18 with a refill container 19. This forward portion of the main brake cylinder thus forms a closed brake circuit. The piston 13 has an oblique face 13a between two running faces, and the push rod 20a of a switch 20 travels along this oblique face 13a.

The second piston 14 disposed behind the front piston 13 travels inside the larger diameter portion of the stepped cylinder 12 and defines a chamber 21, to which a second brake circuit II, by way of example, is then connected. The effective surface area, taking over the reaction of the pressure forces, of the piston 14 embodied as an annular piston is augmented by an end face 22a of a pedal push rod 22 passing through the piston 14. The pedal push rod 22 is actuatable together with a control valve 23 via a pedal plate 24, which is articulated on the brake pedal 25. The control valve 23 is embodied such that in its two possible end positions it connects the chamber 21 with either a relief location (refill container 19) or a source of pressure medium 28 comprising a pump 26 and reservoir 27. The source of pressure medium is completed by a motor 29 for driving the pump 26 and by a switch 30, reacting to the still existing reservoir pressure, for triggering the motor 29.

At this point it should be noted that the structure and the mode of operation, to be described below, of the tandem dual-circuit main brake cylinder shown in FIG. 1 are given solely by way of example, for the sake of better comprehending the embodiment and disposition of a final control element according to the invention and engaging the control valve. It will be understood that a final control element of this kind may be assigned to any desired brake valves of single- or multiple-circuit brake systems, so long as a control valve is provided for the application of auxiliary braking forces, the control valve being accessible to actuation from outside, either directly or indirectly.

The control valve 23 has a control slide 31, which is actuatable via a travel-limiting spring 32 by the pedal plate 24. As a result of the relatively long slide faces of the control slide 31, even in the event of a failure in the energy supply the full pedal travel can still be exploited for actuating the annular piston 14, which after initially free movement for instance is later coupled with the pedal push rod 22 via a coupling device (not shown).

A pre-stressing spring 33 presses the control slide 31 toward the right in the plane of the drawing, into its outset position in which it rests on the pressure push rod 34 on the pedal plate 24, the pedal push rod being under the influence of the travel-limiting spring 32.

By means of brake pressure control elements 35, 36, 37 disposed in the brake lines leading to the wheel brake cylinders, these elements being embodied for example as 3/3-way magnetic valves, the brake system can also have ABS (anti-skid or anti-wheel-locking) functions imposed on it; finally, a switchover magnetic valve 38 is also provided, which upon actuation by the switch 20, if the first piston 13 advances to an excessive depth, indicating a possibly insufficient overall brake pressure in brake circuit I, switches over to the output of brake circuit II.

The actuation end point 39 of the control slide 31 of the control valve 23 is engaged by the arbitrarily actuatable final control element 40, which in the exemplary embodiment shown in FIG. 1 is an electromagnet 41 embodied as a pulling magnet. The electromagnet 41 comprises a winding 42 and an armature 43, which upon triggering of the winding with a current of any desired form, amplitude and clocking is pulled accordingly into the interior of the winding and, via a transverse lever 43a which is necessary in this case and is secured to the armature and to the engagement point 39, actuates the control valve 23 and causes the coupled movement of its control slide 31.

Figure 3:
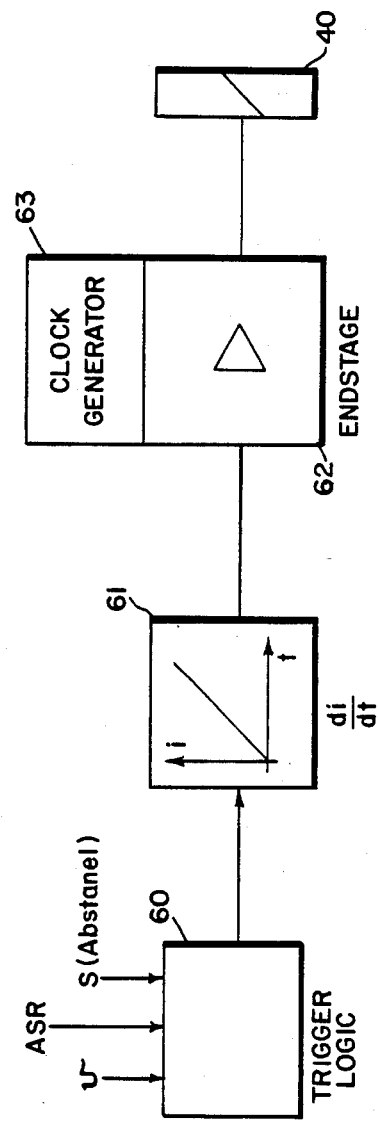
FIG. 3 shows in a block circuit diagram a trigger circuit in accordance with the prior art for providing a clocked end stage.

The following overall mode of operation is thus produced. The control slide 31 can be displaced out of its outset position toward the left, either via the pressure push rod 34 as initiated by the pedal plate 24, or upon lifting away from the pressure push rod 34—even with a non-actuated brake pedal 25—by the triggering of the final control element 40, in FIG. 1 with electrical signals. For example, as shown in FIG. 3, block 60 contains a trigger logic, for example input signals such as speed $v$, ASR (automatic slip regulation) or a system (S) which measures the vehicle spacing (for instance, radar). This trigger logic then determines the course over time of the braking pressure increase or of the current and furnishes this signal to a signal translator 61, which then specifies the course of current over time to the clocked end stage 62. The end stage is combined with a clock generator 63, which triggers the magnetic valve or adjusting magnet with relatively high frequency. This manner of providing a clocked end stage is well known and corresponds with the prior art technology. As a result of this stimulus, the pressure of the auxiliary energy is fed into the pressure chamber 21 from the energy supply 28 via a pressure inlet 44 on the control valve 23, an annular recess 45 and a central flowthrough bore 46 on the control slide 31; from the pressure chamber 21, the pressure first reaches brake circuit II and then, with the supplied pressure being exerted upon the piston 13 as well, a pressure is generated in the chamber 17, which becomes effective as braking pressure in brake circuit I.

This function can be attained even if the brake pedal 25 is not actuated, a function which can be realized even in a stopped vehicle and, by using the hydraulic portion of the brake valve, has the overall effect of feeding pressure into the brake system.

Figure 2:
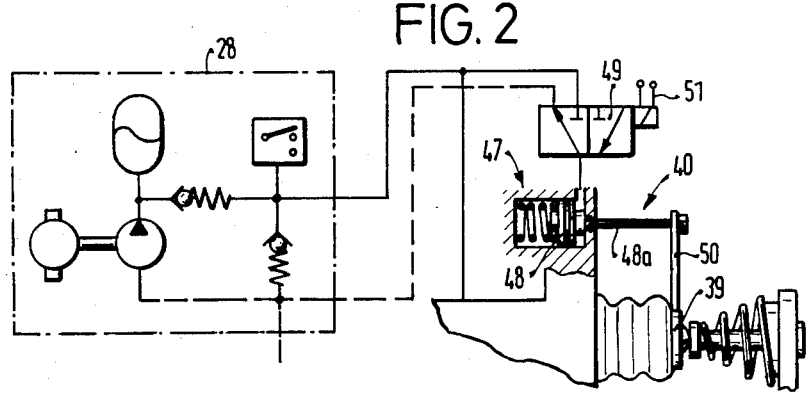
FIG. 2 shows the same main brake cylinder as in FIG. 1, with the final control element realized in the form of a hydraulic work cylinder, which is triggered by a magnetic valve connected to its input.

In the exemplary embodiment of FIG. 2, the difference from FIG. 1 is that the final control element 40 is embodied as a hydraulic work cylinder 47, the control piston 48 of which, under the pressure triggered by a preceding magnetic valve 49, executes a displacement movement and via its piston rod 48a, with a transverse lever 50 secured thereon and on the engagement point 39 for the control slide, carries the control slide with it in its movement in order to actuate the control valve. The triggering of the magnetic valve 49 is again effected by supplying electrical signals, as indicated at 51; the actuation of the brake valve is effected indirectly via the control piston.

By supplying electrical signals, embodied appropriately as needed, which are clocked and are at different current levels with a variation over time for realizing corresponding time/current functions, advantageous opportunities are afforded for further development of ABS control functions, as well as the feeding of pressure in the case of brake valves for realizing drive slippage regulations, self-diagnosis, and interval braking.

In addition, the possibility exists of superimposing a controlled force on the pedal force, which acts upon the control valve via the travel simulator spring. As a result, it is possible to feed in the braking pressure at a higher level than that intended by the driver. This is advantageous at low $\mu$ values, for instance, in which the locking pressure of the front axle is substantially less than that of the rear axle. Many drivers do not effect the necessary higher braking pressure for the rear axle. In that case, an additional control force can be effected in that the braking pressure at the rear axle is increased until ABS regulating signals appear. A similar provision can be realized for eliminating brake fading.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. Main brake cylinder for a vehicle brake system which comprises a hydraulic control valve (23) including at least one control valve element (31) actuated by a brake pedal (25), a pedal push rod (22) protruding into the main brake cylinder beside said control valve (23), which functions as a hydraulic sensing piston and is displaceable by said brake pedal simultaneously with displacement of said control valve element (31), said hydraulic sensing piston acts counter to said brake pedal and in the event of emergency braking acts upon said main brake cylinder upon actuating the brake pedal so as to generate pressure in at least one brake circuit, said brake circuit contains a plurality of electromagnetic control valves for prevention of wheel locking (ABS), said system also includes an electromagnetic control element (40) associated with said control valve (23), said electromagnetic control element adapted to directly actuate said control valve (23) independently of the brake pedal (25) for generating pressure in at least one brake circuit, said electromagnetic control element being disposed relative to said pedal push rod, means for directly coupling said electromagnetic control element to said control valve element (31) of the control valve (23), and means (24, 34) disposed between the brake pedal and the control valve element embodied such that said means transmits only pressure forces onto the control valve element, so that upon an activation of the electromagnetic control element, said brake pedal and said sensing piston remain in their positions of rest.

2. A main brake cylinder as defined by claim 1 wherein said electromagnetic control element comprises an electrical control magnet having an armature at least indirectly secured to a control slide member of said hydraulic control valve.

3. A main brake cylinder as defined by claim 2, further comprising means responsive to control signals for triggering said electromagnetic control element, for effecting corresponding pressure conditions in said at least one brake circuit.

4. A main brake cylinder as defined by claim 3, wherein said hydraulic control valve is actuated externally by the operative engagement of said electromagnetic control element engaging said hydraulic control valve externally.

5. A main brake cylinder as defined by claim 2, wherein said hydraulic control valve is actuated externally by the operative engagement of said electromagnetic control element engaging said hydraulic control valve externally.

6. A main brake cylinder as defined by claim 1, wherein said hydraulic control valve is actuated externally by the operative engagement of said electromagnetic control element engaging said hydraulic control valve externally.

7. A main brake cylinder as defined by claim 1, wherein said electromagnetic control element comprises a work cylinder means having a control piston, and a preceding magnetic valve means for switching said control piston.

8. A main brake cylinder as defined by claim 7, wherein said hydraulic control valve is actuated externally by the operative engagement of said electromagnetic control element engaging said hydraulic control valve externally.

9. A main brake cylinder as defined by claim 7, further comprising means responsive to control signals for triggering said electromagnetic control element, for effecting corresponding pressure conditions in said at least one brake circuit.

10. A main brake cylinder as defined by claim 9, wherein said hydraulic control valve is actuated externally by the operative engagement of said electromagnetic control element engaging said hydraulic control valve externally.

11. A main brake cylinder as defined by claim 1, further comprising means responsive to control signals for triggering said electromagnetic control element, for effecting corresponding pressure conditions in said at least one brake circuit.

12. A main brake cylinder as defined by claim 11, wherein said hydraulic control valve is actuated externally by the operative engagement of said electromagnetic control element engaging said hydraulic control valve externally.

* * * * *